United States Patent

Bellino

(10) Patent No.: US 8,948,492 B2
(45) Date of Patent: Feb. 3, 2015

(54) QUALITY CONTROL METHOD FOR A MACHINE FOR PRODUCING PACKAGING

(75) Inventor: Mario Bellino, Orbe (CH)

(73) Assignee: Bobst Mex SA (CH)

( * ) Notice: Subject to any disclaimer, the term of this patent is extended or adjusted under 35 U.S.C. 154(b) by 140 days.

(21) Appl. No.: 13/825,360

(22) PCT Filed: Aug. 18, 2011

(86) PCT No.: PCT/EP2011/004151
§ 371 (c)(1),
(2), (4) Date: Mar. 21, 2013

(87) PCT Pub. No.: WO2012/038010
PCT Pub. Date: Mar. 29, 2012

(65) Prior Publication Data
US 2013/0177233 A1    Jul. 11, 2013

(30) Foreign Application Priority Data
Sep. 22, 2010   (EP) .................................... 10010139

(51) Int. Cl.
G06K 9/00     (2006.01)
G06K 9/62     (2006.01)
G06K 9/20     (2006.01)
G06T 7/00     (2006.01)
B31B 1/74     (2006.01)

(52) U.S. Cl.
CPC . *G06T 7/001* (2013.01); *B31B 1/74* (2013.01); *B31B 2201/95* (2013.01)
USPC ........................... 382/141; 382/209; 382/283

(58) Field of Classification Search
None
See application file for complete search history.

(56) References Cited

U.S. PATENT DOCUMENTS 8,073,239 B1 *  12/2011  Bahrami et al. .............. 382/143
2004/0251176 A1 *  12/2004  Alonso et al. ................. 209/576

FOREIGN PATENT DOCUMENTS

GB     2 424 416 A       9/2006
WO     WO 01/87582 A1    11/2001

OTHER PUBLICATIONS

International Search Report dated Feb. 6, 2012 issued in corresponding International patent application No. PCT/EP2011/004151.

* cited by examiner

*Primary Examiner* — Bhavesh Mehta
*Assistant Examiner* — David F Dunphy
(74) *Attorney, Agent, or Firm* — Ostrolenk Faber LLP

(57) ABSTRACT

A quality control method for a machine for processing flat objects for producing packaging: A prepress file for packaging is used to define, in an extremely simple and quick way, masked zones which define which parts of the surface of the object are the parts in which the defects are not to be considered.

4 Claims, 2 Drawing Sheets

QUALITY CONTROL METHOD FOR A MACHINE FOR PRODUCING PACKAGING

CROSS-REFERENCE TO RELATED APPLICATIONS

The present application is a 35 U.S.C. §§371 national phase conversion of PCT/EP2011/004151, filed Aug. 18, 2011, which claims priority of European Application No. 10010139.3, filed Sep. 22, 2010, the contents of which are incorporated by reference herein. The PCT International Application was published in the French language.

BACKGROUND OF THE INVENTION

The present invention relates to a quality control method for a machine for producing packaging.

There are various types of processing machines used for producing packaging: for example some of these machines process strips, printing them then cutting them into individual copies. Others process sheets by printing them, including possibly by stamping, and others still convert printed sheets by cutting them into individual copies. Finally, some machines have the task of folding and gluing individual copies. The materials of which the strips or sheets are made may be paper or cardboard, or even a plastic.

Quality control systems exist which are able to detect the presence of defects on all the objects converted by a machine, whether these be sheets or individual copies. Depending on the type of machine, quality control may be carried out during the conversion process, for example after a printing process but before a cutting process performed in the same machine, or alternatively may be carried out at the end of the conversion process, for example in the case of machines which do nothing more than print sheets without cutting them, such as specialist machines for stamping and applying metalization. Or alternatively it may be formed at the entry to the machine, for example to check the quality of the individual copies entering a folder-gluer. Usually, the presence of a defect results in the non-conforming object being ejected.

The existing quality control systems are based on a method that involves acquiring a reference image then acquiring, for each object the quality of which is to be controlled, an image that is compared against the reference image. Conventional image processing programs allow this comparison to be made and the defects thus to be detected.

The useful surface to be quality-controlled may vary according to the type of object being quality-controlled, sheet or individual copy. For example, in the case of a printed sheet that will later be cut into a number of individual copies, a defect might be detected in a part of the sheet which will not form part of an individual copy, but which will become waste. The presence of such a defect must not result in the quality-controlled object being rejected, because the defect will ultimately no longer be present in the actual packaging.

In order to avoid detecting defects in zones that are not relevant, certain quality control methods involve a step of defining masked zones. Before being able to begin a conversion job on the machine, the user of the machine manually defines those zones that are not relevant, known as masked zones, using the reference image. These zones are usually basic geometric shapes, for example polygons or ellipses. Once all of the masked zones have been defined by hand, the set is saved either in the form of a model that defines only the geometry of all the masked zones and their position within the image, or in the form of a file known as a job file which contains not only the model, but also all the parameters needed for performing quality control. For example, the job file may contain the reference image, data regarding the brightness of the lighting, or data regarding the sensitivity of the camera.

In the existing quality control methods, this step of defining the masked zones is performed directly on the machine.

Once the phase of defining the masked zones has been completed, the user can go on to convert a set of objects, by performing quality control on each one of them without defects being detected in zones that are not relevant, because these zones have been defined as masked zones. When he wishes later to convert another set made up of the same elements, he will not have to repeat the phase of defining the masked zones—all he will need to do is use the job file, or at least the model defined earlier.

Nevertheless, defining a new job of work is a lengthy and painstaking process. The technical problem addressed by the invention is therefore that of making the defining of a new job of work quicker and easier.

SUMMARY OF THE INVENTION

The present invention relates to the features that will become apparent during the course of the description which follows, and which should be considered in isolation or in any technically feasible combination.

Any creator of packaging uses computer tools to define the images that will be printed on the surface of the packaging, the zones that will be stamped or embossed or which will undergo a special treatment. These tools can also be used to define the cutting lines and the scoring lines that will be used for folding. The result is what is commonly known as a prepress file. These files exist in different formats, for example PDF, JDF or TIFF format, and have the special feature of containing various blueprints: usually at least one blueprint per conversion operation needed to produce the packaging. Thus, there will be one blueprint per color, one blueprint for stamping, one blueprint for cutting and scoring, etc.

This file is then used by the various manufacturers of tools and printing forms for the various machines that will be used in succession in the production of this packaging.

According to the invention, the prepress file will be used not only to define the tools as hitherto, but also during the quality control methods on the various machines.

In one step of a quality control method according to the invention, in addition to the steps already present in the existing quality control methods, the reference image and the corresponding image defined by the prepress file of the corresponding package are mapped against one another. For example, if quality control is performed after a four-color print run, the mapping will be between the reference image of the object and the combination of the four blueprints that correspond to the four colors in the prepress file of the packaging in question.

This mapping makes it possible to define a scaling of the data of the prepress file, their positions and even their orientation, against the reference image and against the images acquired during the quality control phase performed on a set of flat objects. Said mapping is fully automatic.

In another step of a quality control method according to the invention, which is independent of the mapping step, the scoring and cutting blueprint is extracted from the prepress data. This is the blueprint that corresponds to the cutting and scoring conversion often performed in a platen press.

This description, which is given by way of nonlimiting example, is intended to provide a better understanding of the substance of the invention and of how it may be embodied. The description is given with reference to the attached drawings, in which:

DESCRIPTION OF AN EMBODIMENT

Figure 1:
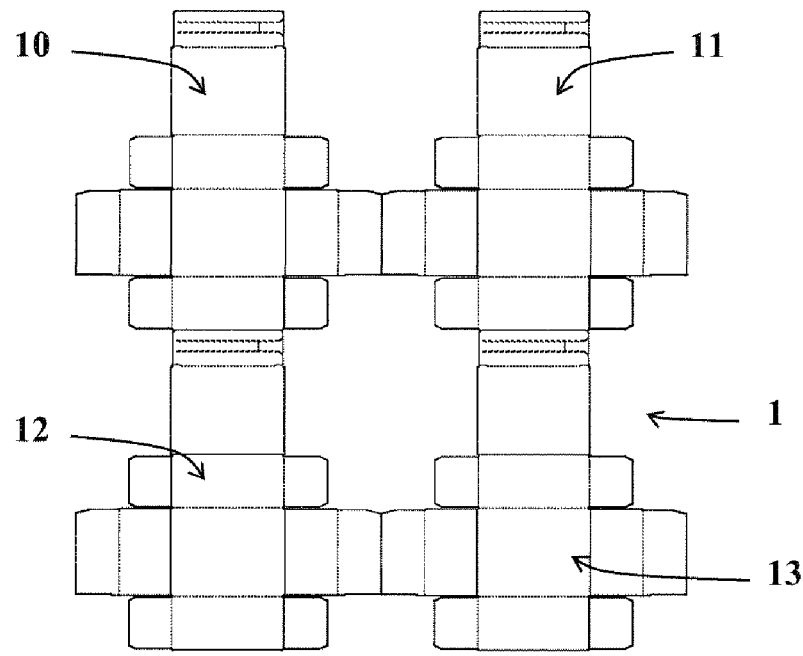
FIG. 1 illustrates the cutting and scoring blueprint of a prepress file

FIG. 1 depicts one example of a cutting and scoring blueprint (1). This blueprint (1) represents a sheet that will be cut into four identical individual copies (10, 11, 12, 13). A next step of analyzing the blueprint allows all the closed zones contained in the blueprint, and also the external zone of the blueprint, to be identified automatically.

Figure 2:
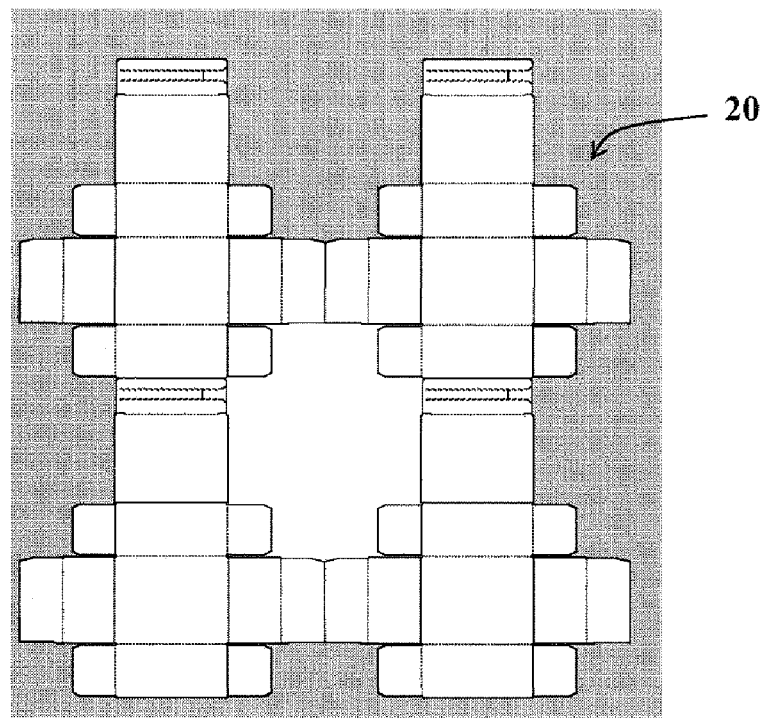
FIG. 2 shows the blueprint after an exterior zone has been automatically selected
Figure 3:
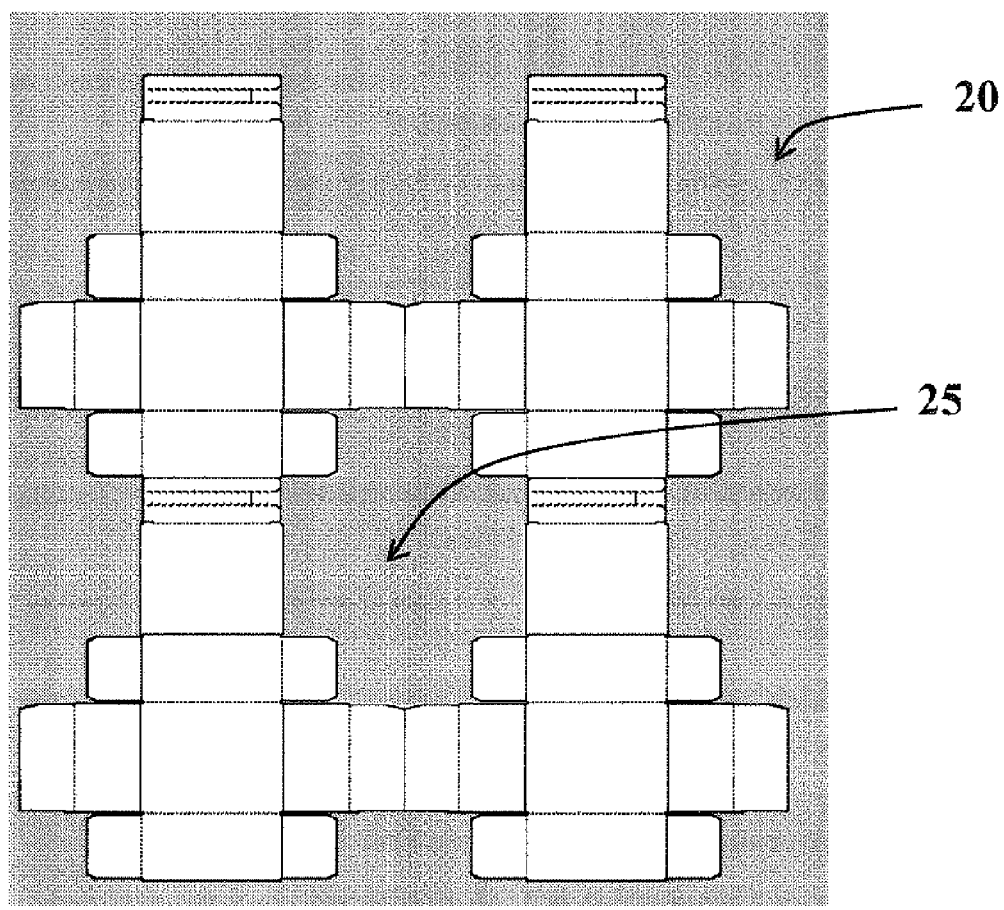
FIG. 3 shows the blueprint after a closed zone has been manually selected.

Next, the entire external zone (20) is automatically defined as corresponding to a masked zone. The interior edge of this zone (20) may be extremely complex, as in the example depicted in FIG. 2, which corresponds to the blueprint (1) of FIG. 1. This automatic definition saves precious time over having to perform a manual definition on the basis of the reference image.

In a next step, the user can manually select the closed zones which correspond to masked zones. Here too, the contour of the zone may be highly complex, and it can be selected extremely rapidly by comparison with the task of defining it by hand. In the example of the blueprint (1) of FIG. 1, the object is a sheet which will be cut into four individual copies (10, 11, 12, 13) that touch one another. As a result, between the four individual copies there is a closed central zone (25) which corresponds to a waste product that will be produced when the individual copies are cut out. With a simple click of the mouse, the user can define this closed central zone (25) as corresponding to a masked zone. Once again, the time saving over manually defining the masked zone from the reference image is considerable.

Next, the masked zones are obtained from the identified zones (20, 25) either automatically, in the case of the exterior zone (20), or manually in the case of closed zones of the blueprint that have been selected by the user (25), and from the scaling data and data regarding relative position which were obtained during the mapping phase.

Thus, thanks to the data calculated during the mapping phase, it is easy to switch from zones defined on the basis of the cutting and scoring prepress file to corresponding zones in the reference image and in the images of the flat objects which were acquired during the quality control phase of a set of objects processed by the machine.

This new way of defining the masked zones may optionally be combined with a manual definition of masked zones either directly on the reference image as in the known methods, or on the basis of the print blueprints of the prepress file. In the second instance, it would be necessary to use the scaling and positioning data calculated during the mapping phase in order to ensure that the zones defined using the prepress file tally with the zones of the acquired images.

Advantageously, in addition to defining the masked zones, the method also allows warning zones to be defined. These zones allow the defects that they contain to be considered in a different way.

For example, it may be desirable to keep a tally of the printing defects that appear in warning zones and which, ultimately, will not be visible on the packaging. Even if the object does not have to be ejected, the defect indicates that printing is imperfect and that a maintenance or adjustment operation might be required.

The various phases and steps of a method according to the invention can be carried out in the machine, in an additional quality control device. Some steps may be carried out in a remote computer, particularly all the phases regarding the processing of the prepress file, analysis of the printing and cutting and scoring blueprints, or the defining of zones on the basis of these blueprints.

The invention claimed is:

1. A quality control method for a machine for processing flat objects for producing packaging, comprising:
a phase of defining a job of work, comprising:
acquiring a reference image of a flat object;
defining masked zones and unmasked zones of the object;
then perform a quality control phase of a set of flat objects comprising, for each flat object quality-controlled:
acquiring an image of the surface of the quality-controlled flat object;
determining the presence of defects as a function of the result of a comparison between the acquired image and the reference image;
giving consideration only to those defects that lie in an unmasked zone,
receiving a prepress file of the packaging, prior to the step of defining the masked and unmasked zones; then
mapping the reference image with the print blueprint of the prepress file, determining scaling factors and relative positions;
said step of defining masked zones and unmasked zones also comprises:
extracting the scoring and cutting blueprint from the prepress file; then
analyzing the scoring and cutting blueprint to identify all the closed zones of the blueprint and an exterior zone of the blueprint; then
automatically defining a masked zone on the basis of the exterior zone of the blueprint, of the scaling factors and of the relative positions; and
manually defining masked zones on the basis of the manual selection of closed zones of the scoring and cutting blueprint, the scaling factors and the relative positions.

2. A quality control method according to claim 1, wherein defining masked zones and unmasked zones also comprises manually defining masked zones on the basis of the reference image.

3. A quality control method according to claim 1, wherein defining masked zones and unmasked zones also comprises manually defining masked zones on the basis of the print blueprint from the prepress file, the scaling factors and the relative positions.

4. A quality control method according to claim 1, wherein defining masked zones also allows defining of warning zones, and different consideration of the defects identified in a warning zone.

\* \* \* \* \*